United States Patent
Zhao et al.

(10) Patent No.: US 9,770,829 B2
(45) Date of Patent: Sep. 26, 2017

(54) MULTIFUNCTIONAL ENGINEERING ACCESSORY WITH 6-BAR MECHANISM

(71) Applicant: Beijing University of Technology, Beijing (CN)

(72) Inventors: Jing Zhao, Beijing (CN); Bochen Song, Beijing (CN); Jiawei Wu, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 15/315,716

(22) PCT Filed: Jun. 1, 2016

(86) PCT No.: PCT/CN2016/084283
§ 371 (c)(1),
(2) Date: Dec. 1, 2016

(87) PCT Pub. No.: WO2017/012420
PCT Pub. Date: Jan. 26, 2017

(65) Prior Publication Data
US 2017/0190055 A1    Jul. 6, 2017

(30) Foreign Application Priority Data
Jul. 21, 2015 (CN) .......................... 2015 1 0432517

(51) Int. Cl.
*B23D 15/00* (2006.01)
*B25J 15/02* (2006.01)
(Continued)

(52) U.S. Cl.
CPC ............ *B25J 15/022* (2013.01); *B23D 15/00* (2013.01); *B23D 33/00* (2013.01); *B25J 15/08* (2013.01)

(58) Field of Classification Search
CPC ...... B25J 15/022; B25J 15/08; B25J 11/0045; B25J 15/0293; B25J 15/0009;
(Continued)

(56) References Cited

U.S. PATENT DOCUMENTS

| 4,261,609 A * | 4/1981 | Kraszewski ........... B22D 29/04 294/119.1 |
| 8,382,177 B2 | 2/2013 | Rizk et al. |

(Continued)

FOREIGN PATENT DOCUMENTS

| CN | 103722561 A | 4/2014 |
| CN | 104589364 | 5/2015 |

(Continued)

*Primary Examiner* — Jonathan Riley
*Assistant Examiner* — Liang Dong
(74) *Attorney, Agent, or Firm* — Beijing University of Technology

(57) ABSTRACT

A multifunctional engineering accessory with 6-bar mechanism comprising: a 6-link rod clamping device, a shear-fork separation device, a shearing device and locking device. Motion and lock of the 6-link rod group are implemented through a swing hydraulic cylinder of the 6-link rod clamping device to implement extending and withdrawing processes of a clamping paw. The shear-fork separation device can separate an accessory holder to meet the lateral dimension requirement of the multifunctional accessory. The shearing device can implement shearing and crushing function of multifunctional accessory, and the motion location of the accessory holder is confirmed by locking device while at the same time it sustains counterforce generated when the multifunctional accessory is working. The hydraulic ram is the power supply of the whole device. The present disclosure combines shearing, crushing and clamping on one accessory, and the structure design is a novelty, the driven pattern is reasonable, and the manufacturing technology is simple and easy to operate. The device can implement the crushing and moving processes of ruins better, while at the same time improving the economic efficiency.

3 Claims, 14 Drawing Sheets

(51) Int. Cl.
*B25J 15/08* (2006.01)
*B23D 33/00* (2006.01)

(58) Field of Classification Search
CPC ....... B25J 15/0266; B25J 15/10; B23D 15/00; B23D 33/00; B65B 25/04; B65B 25/046; B65B 5/105
See application file for complete search history.

(56) References Cited

U.S. PATENT DOCUMENTS

| | | | |
|---|---|---|---|
| 8,584,557 B2* | 11/2013 | Hall | B23B 3/26 82/113 |
| 2010/0314895 A1 | 12/2010 | Rizk et al. | |
| 2012/0279614 A1* | 11/2012 | Terrell | A01G 23/095 144/343 |
| 2014/0265401 A1* | 9/2014 | Allen Demers | B25J 15/0009 294/201 |

FOREIGN PATENT DOCUMENTS

| | | |
|---|---|---|
| CN | 104972477 A | 10/2015 |
| GB | 2471019 A | 12/2010 |

* cited by examiner

MULTIFUNCTIONAL ENGINEERING ACCESSORY WITH 6-BAR MECHANISM

CROSS REFERENCE TO RELATED APPLICATION

This application is a national stage application of International application number PCT/CN2016/084283, filed Jun. 1, 2016, titled "A multifunctional engineering accessory with 6-bar mechanism," which claims the priority benefit of Chinese Patent Application No. 201510432517.2, filed on Jul. 21, 2015, which is hereby incorporated by reference in its entirety.

TECHNICAL FIELD

The present disclosure relates to mechanical design, hydraulic control and earthquake engineering, and particularly to a multifunctional engineering accessory with a 6-bar mechanism.

BACKGROUND

Earthquake leads direct or indirect damages to national economic construction and peoples' life and property. It is meaningful to use an efficient relief device to save millions of peoples' life. Compared with current earthquake relief and rescue approaches, hydraulic pincer and rock grabbing devices play an important role in a forcible entry process during earthquake relief by implementing multi-purposes in a single device. This is very meaningful for earthquake relief and economic construction after the earthquake. Current rescue multi-purpose devices usually use arm structures; a single mechanical arm is installed with a single accessory. The method has some problems such as inconvenient operation, difficult to manufacture and high investment. Accordingly, a new combining way of accessories is need such that multiple functions may be simply implemented by a device.

SUMMARY

The purpose of the present disclosure is to design an accessory with shearing, crushing and clamping functions at the same time. To overcome a technical obstacle, multi-functions are implemented in a device with a reasonable design.

A multifunctional engineering accessory with 6-bar mechanism may include: 6-link rod clamping device (A), shear-fork separation device (B), shearing device (C) and locking device (D);

6-link rod clamping device (A) includes: swing hydraulic cylinder (19), bending handle (16), transition rod (21), first-link rod (17), second-link rod (18) and clamping paw (15), 6-link rod clamping device (A) is immobilized on hydraulic shearing equipment (5); swing hydraulic cylinder (19) connects with bending handle (16); transition rod (21) connects with first-link rod (17) and bending handle (16) respectively; first-link rod (17) connects with second-link rod (18); bending handle (16) and second-link rod (18) connect with clamping paw (15) to ensure the relative location of clamping paw (15) on hydraulic shearing equipment (5); bending handle (16) driven by swing hydraulic cylinder (19) moves to a different location to implementing an extending process and a withdrawing process of clamping paw (15); clamping paw (15) moves to location "a", swing hydraulic cylinder (19) is locked to make clamping paw (15) immobilized on location "a", then the extending process of clamping paw (15) is finished; open swing hydraulic cylinder (19), clamping paw (15) moves to location "b" which is driven by bending handle (16), swing hydraulic cylinder (19) is locked, the withdrawing process of clamping paw (15) is finished;

Shear-fork separation device (B) includes: hydraulic cylinder (10), hydraulic cylinder driving rod (12), fixing plate (11), cross rods (9), connection rods (8); hydraulic pressure driving system is formed by hydraulic cylinder (10) and hydraulic cylinder driving rod (12); connection rods (8) are cross-connected with each other to form a shear-fork structure; hydraulic cylinder (10) driving rod (12) connects with connection rods (8); cross rod (9) is set on the connection point of two connection rods to ensure stability of shear-fork structure; connection rods (8) connect with fixing plate (11); fixing plate (11) connects with accessory holder (3); moving of hydraulic cylinder driving rod (12) is driven by hydraulic cylinder (10) to push fixing plate (11) which connect with holder to move, separation of accessory holder (3) is implemented, and the lateral dimension requirement of clamping function is met;

Shearing device (C) includes: hydraulic shearing equipment (5) and hydraulic driving cylinder (4); shearing device (C) is installed on accessory holder (3); hydraulic shearing equipment (5) connects with accessory holder (3); hydraulic driving cylinder (4) connects with hydraulic shearing equipment (5) to provide power; 6-link rod clamping device (A) is installed on two sides of hydraulic shearing equipment (5); hydraulic cylinder (4) drives the accessory to finish shearing, crushing and clamping function;

Locking device (D) includes: accessory substrate (2) and located block (7); locating slot (6) is set on accessory substrate (2), locating slot (6) includes 6 different locations, location 1-6, 6 locations are symmetrically distributed along the center line of accessory substrate (2); slide track is set on accessory substrate (2), the separation closing rectilinear motion of accessory holder (3) is implemented; the initial location of located block (7) is inserted into location 1 and location 2 of locating slot (6) to maintain the closure state of accessory holder (3); located block (7) descends and break away from location 1 and location 2 of locating slot (6), accessory holder (3) is separated; after the separation process of accessory holder (3) is finished, the located block is inserted into location 3, location 4, location 5 and location 6 of locating slot (6), immobilization of accessory holder (3) is finished.

Connection rods (8) are cross-connected with each other to form shear-fork structure; hydraulic cylinder (10) drives shear-fork separation device (B) to move, separation of accessory holder (3) is implemented, the lateral dimension requirement of clamping function is reached; shear-fork structure can sustain huge force which satisfies the stress requirement of accessory holder (3) after separation.

There is relative movement between accessory substrate (2) and accessory holder (3); slide track and locating slot (6) is set on accessory substrate (2); locating slot (6) includes different locations, location 1 and location 2 are used for immobilizing the location of accessory holder (3) under closure state; location 3, location 4, location 5 and location 6 of locating slot (6) are used for the location of accessory holder (3) under open state; the top of accessory substrate (2) connects with angling cylinder (1) which make the multifunctional accessory spinning on the surface.

Accessory holder (3) is separable structure; located block (7) is installed on the accessory holder (3), which is extended and withdrawn to implement the separating and immobilizing connection between the accessory substrate (2) and accessory holder (3).

Compared with current technics, the present disclosure has advantages as below:

The present disclosure maintains a laborsaving structure of a hydraulic pincer. Through the separation design of the accessory holder structure, dimensions of multifunctional accessory is increased so that the clamping function is increased while at the same time a power foundation of the hydraulic pincer is maintained.

Separation mechanism of the accessory holder uses a mechanical structure design of shear-fork separation. The design of the present disclosure is simple and easier to be implemented. The design can sustain the large lateral force, and force stability of the clamping paw during working process is maintained.

With respect to extending and withdraw processes, clamping device uses 6-link rods connection. With a whole 6-link rods mechanism installed on a hydraulic shearing device, clamping mechanism motion is relatively static with the hydraulic shearing device, motion and locking of the clamping paw are implemented through the swing hydraulic cylinder. Accordingly, the mechanical structure is simplified, and the number of the component is decreased.

In the present disclosure, through an optimization design of a mechanical structure, functions are combined into one accessory, which is highly integrated and easier to operate. There was no similar accessory design.

In the figures: A. 6-link rod clamping device, B. shear-fork separation device, C. shearing device, D. locking device, 1. angling cylinder, 2. accessory substrate, 3. accessory holder, 4. hydraulic driving cylinder, 5. hydraulic shearing equipment, 6. locating slot, 7. located block, 8. connection rods, 9. cross rod, 10. hydraulic cylinder, 11. fixing plate, 12. driving rod of the hydraulic cylinder, 13. head of hydraulic shearing equipment, 14. crushing head of hydraulic shearing equipment, 15. clamping paw, 16. bending handle, 17. first-link rod, 18. second-link rod, 19. swing hydraulic cylinder, 20. swing hydraulic cylinder rod, and 21. transition rod.

DETAILED DESCRIPTION OF THE PREFERRED EMBODIMENTS

Figure 1:
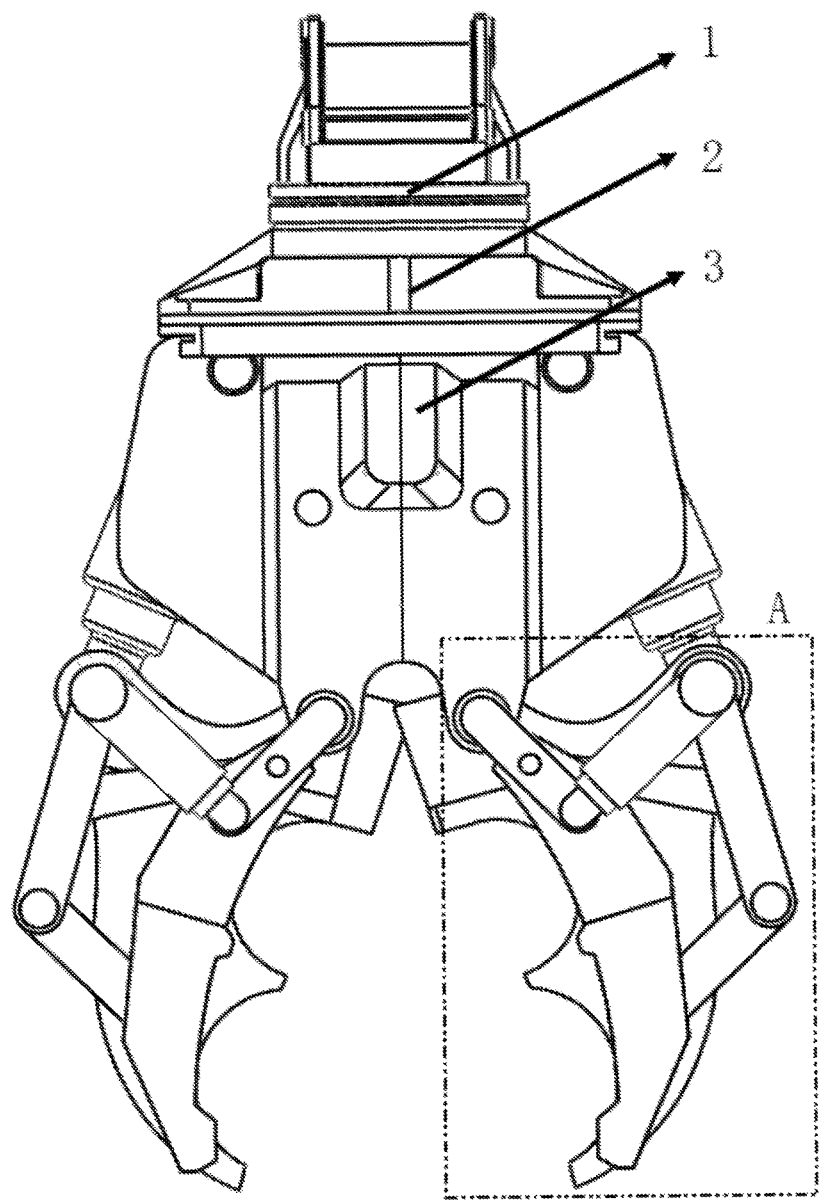
FIG. 1 illustrates a three-dimensional front view of an integrated device.
Figure 2:
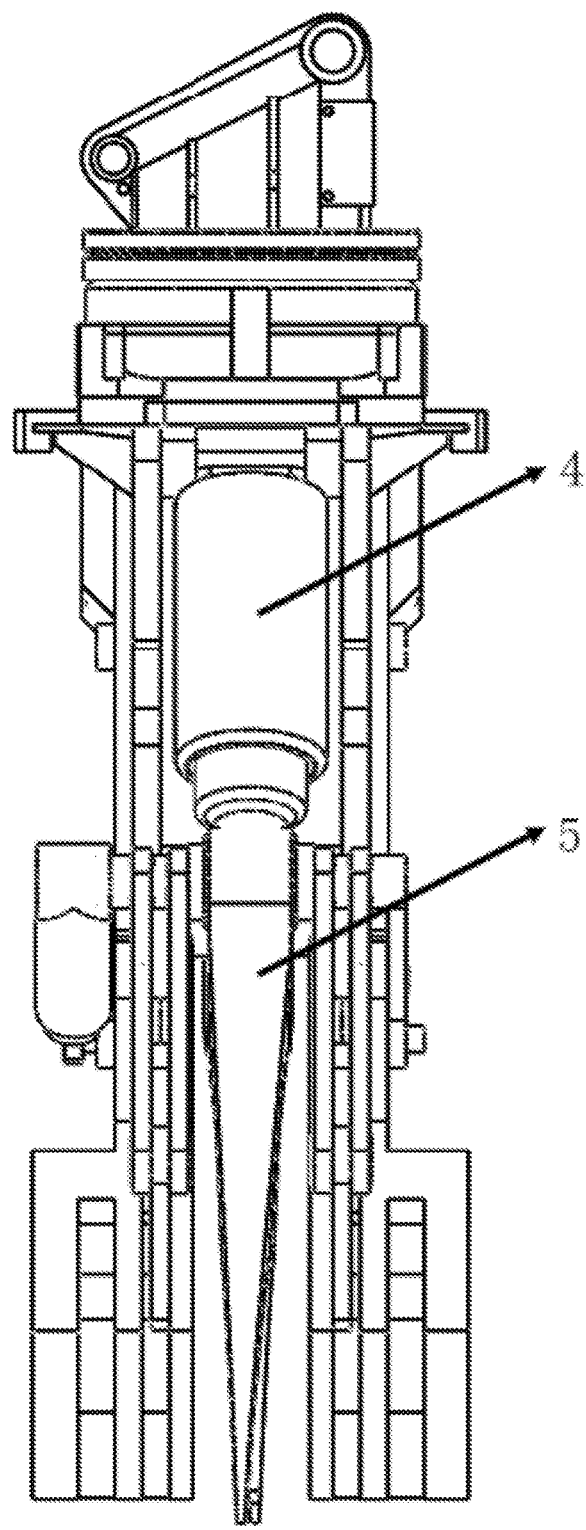
FIG. 2 illustrates a three-dimensional side view of an integrated device.
Figure 3:
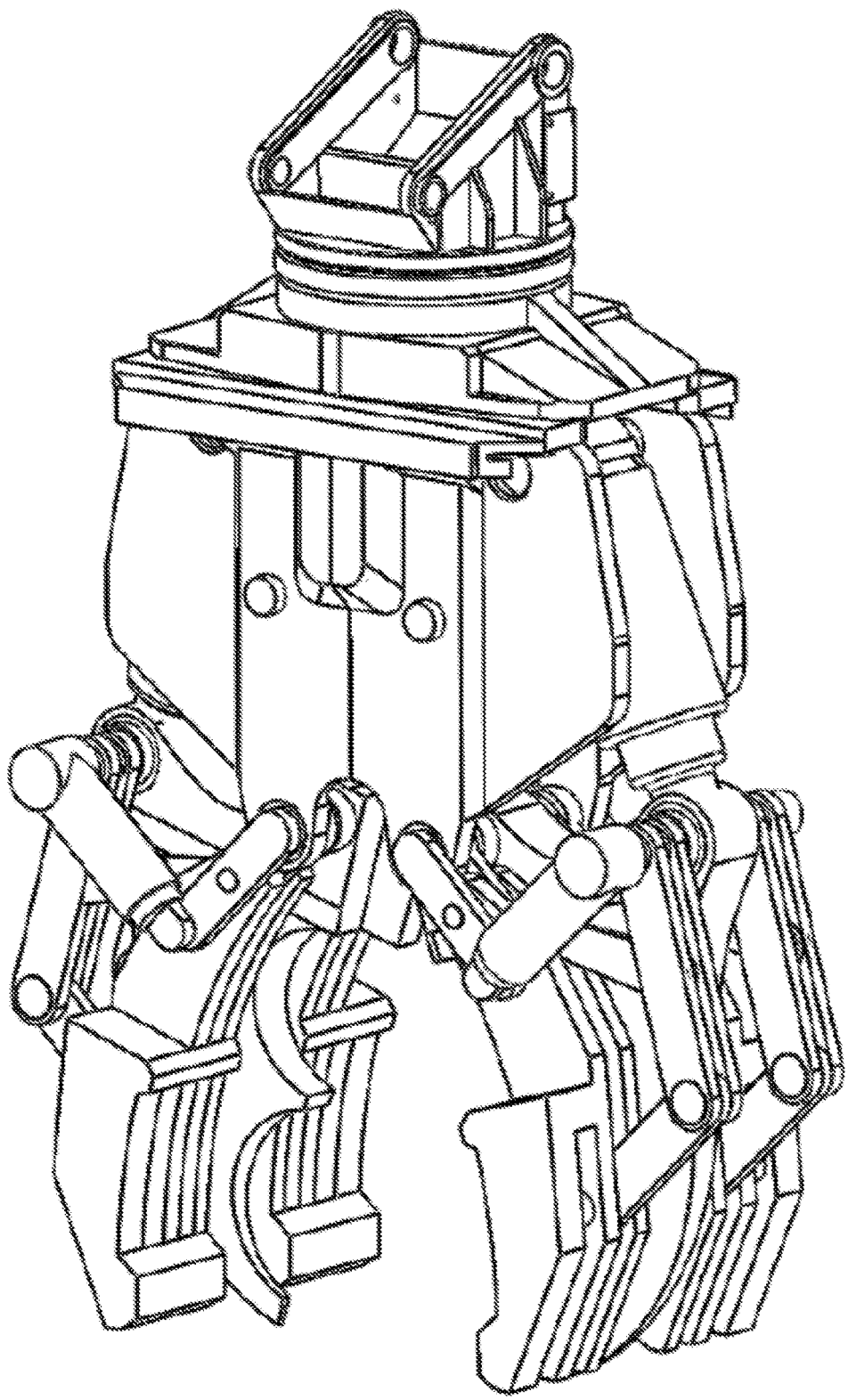
FIG. 3 illustrates a three-dimensional axonometric drawing of an integrated device.
Figure 4:
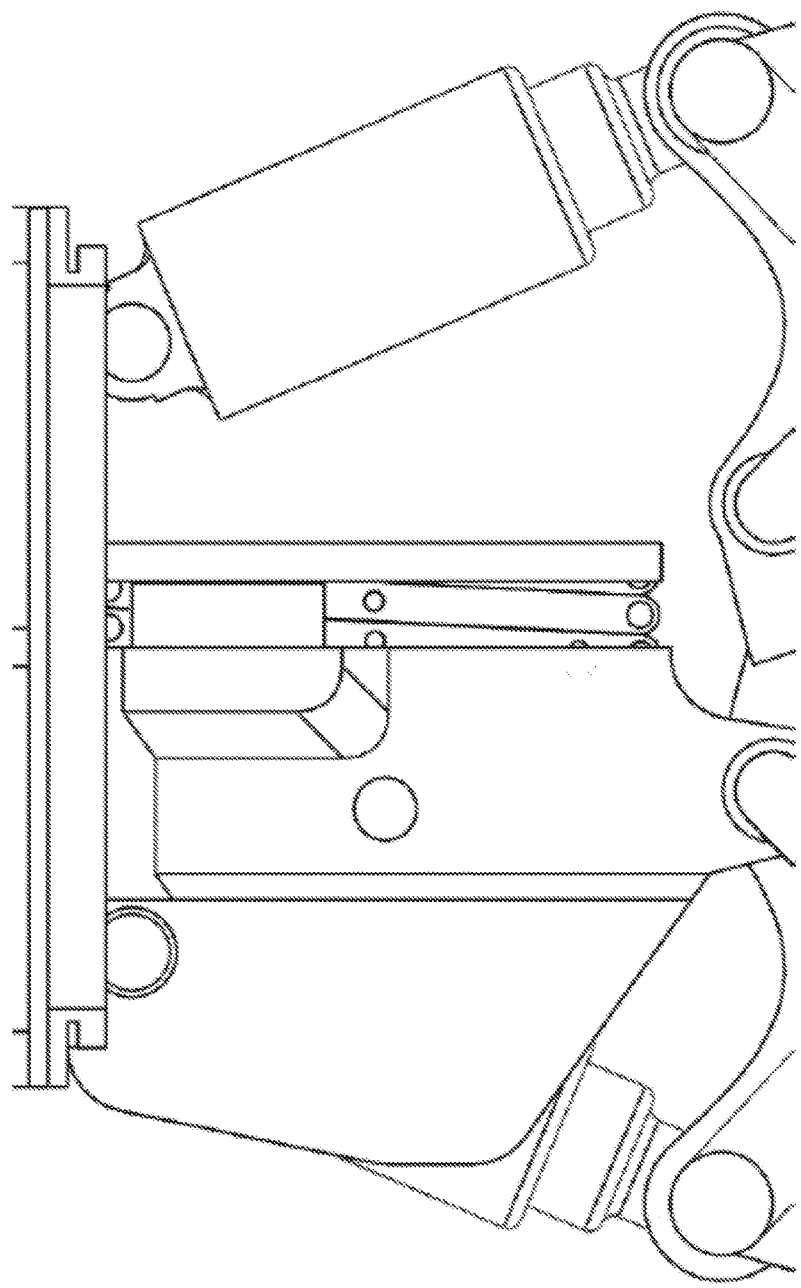
FIG. 4 illustrates an interior mechanism of an accessory holder.

In FIGS. 1, 6, 7 and 12, a multifunctional engineering accessory with a 6-bar mechanism, comprising: 6-link rod clamping device (A), shear-fork separation device (B), the shearing device (C) and locking device (D). FIG. 1 illustrates shearing and crushing working state of multifunction rescue accessories. At that time, locked block (7) which locates in the accessory holder (3) insert into locking slot (6), shear-fork separation device (B) is in a closure state, accessory holder (3) and accessory substrate (2) is relatively immobilized. 6-link rod clamping device (A) is under a withdrawing state, swing hydraulic cylinder (19) is locked, keeping the location of clamping paw (15) to prevent operation of hydraulic shearing equipment (5) from interference. Hydraulic driving cylinder (4) as main power supply pushes the motion of hydraulic shearing equipment (5), head of hydraulic shearing equipment (13) is located on the top of hydraulic shearing equipment (5), and it is used to implement shearing function, crushing head of hydraulic shearing equipment (14) is used to implement a crushing function.

Figure 12:
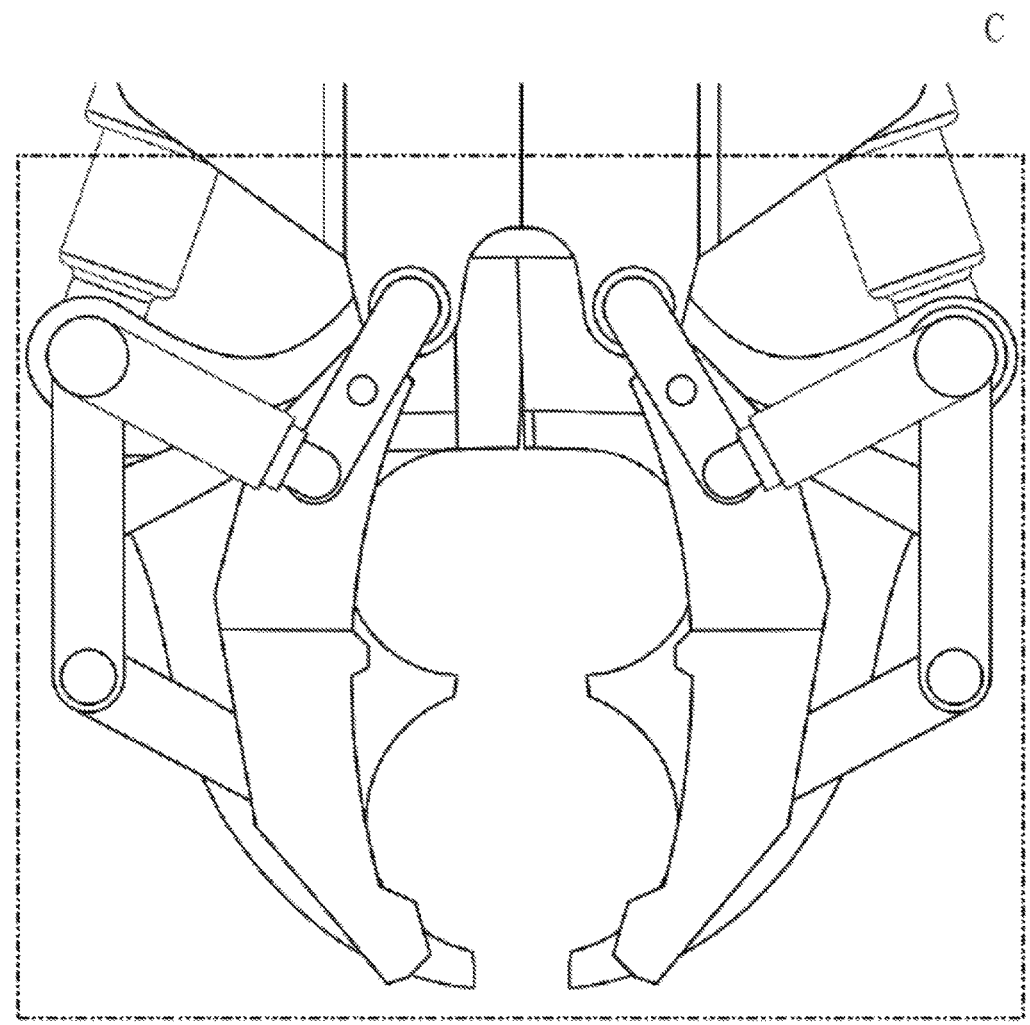
FIG. 12 illustrates an accessory under a shear crushing state.

FIG. 12 illustrates the location of the hydraulic driving cylinder (4), which pushes hydraulic shearing equipment (5) into working state.

Figure 5:
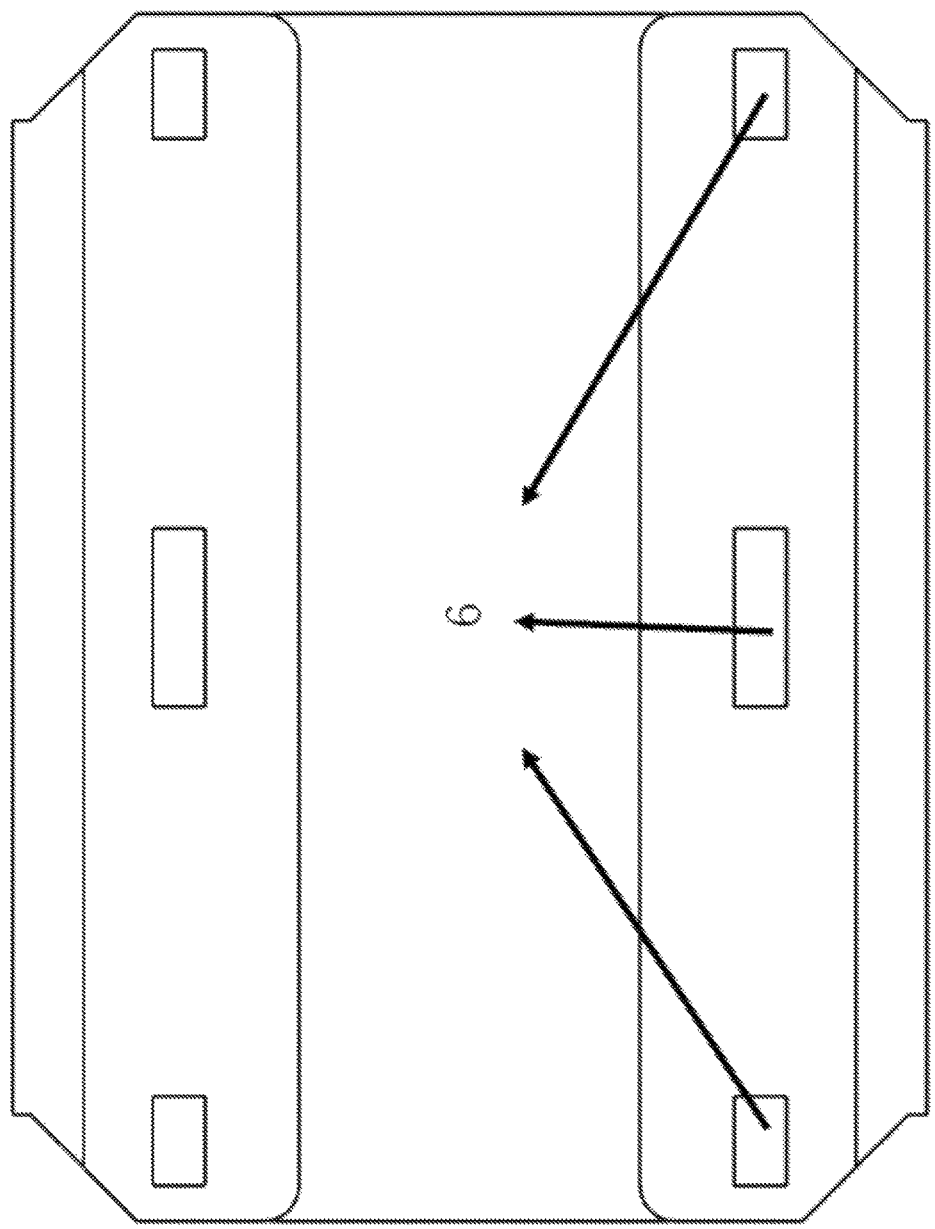
FIG. 5 illustrates a locking slot of an accessory substrate.
Figure 6:
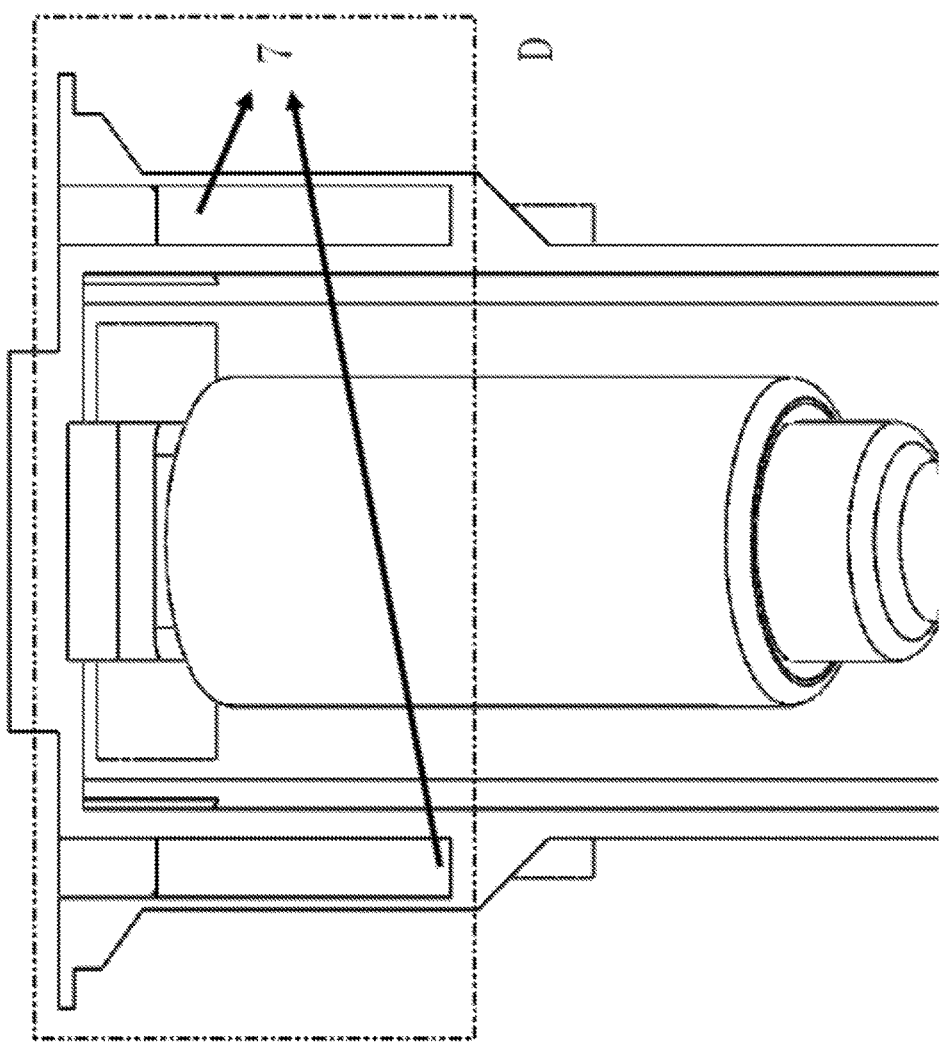
FIG. 6 illustrates a locking block of an accessory holder.

In FIG. 6, when clamping function of multifunctional accessory is needed, locked block located on the accessory holder (3) is withdrawn from locating slot (6), as illustrated in FIG. 5.

Figure 7:
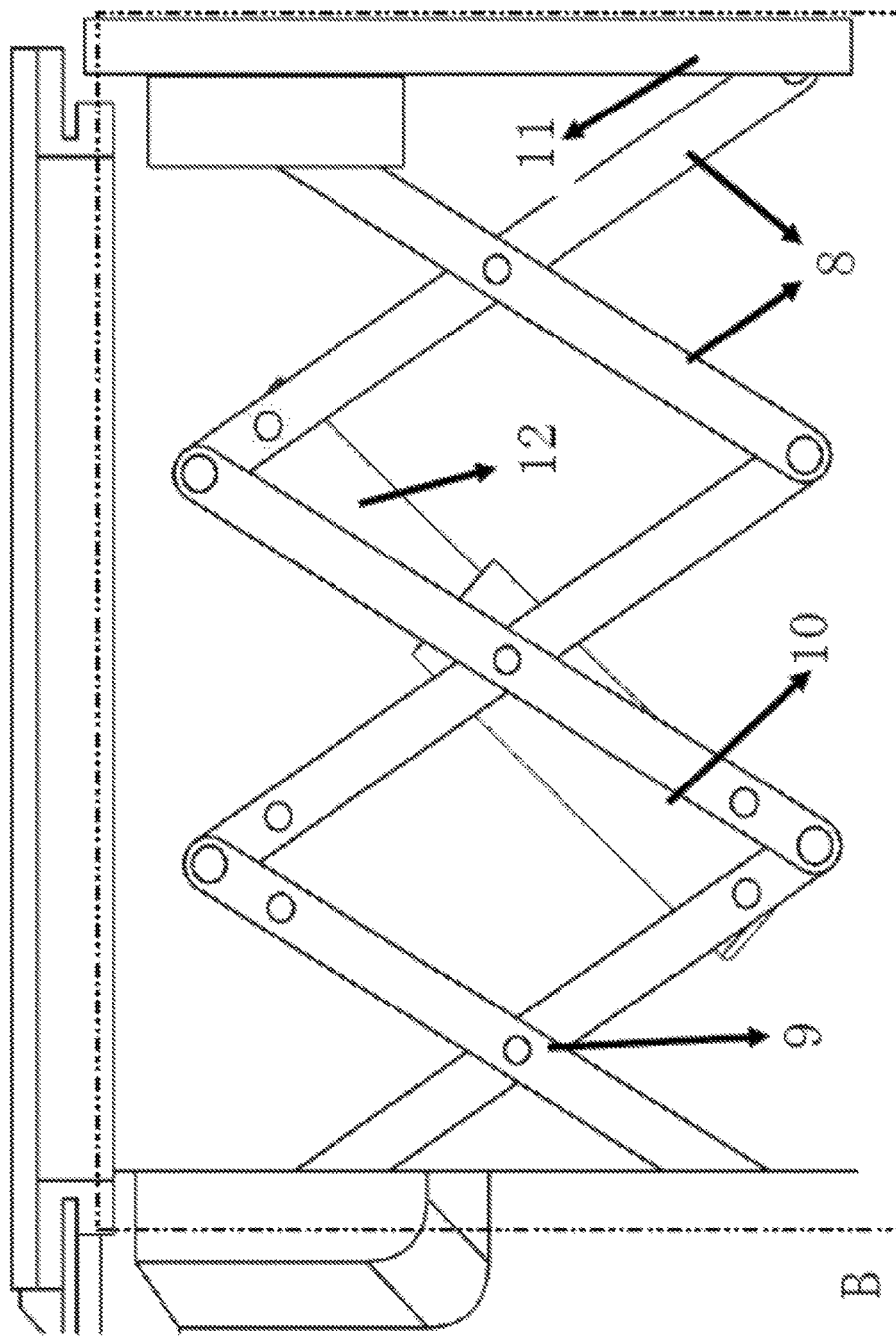
FIG. 7 illustrates a shear-fork separation mechanism.

In FIG. 7, a hydraulic cylinder (10) in shear-fork separation device drives the driving rod of the hydraulic cylinder to push connection rods to move. Connection rods (8) drive fixing plate (11) connects with accessory holder (3) to move to both sides to make accessory holder (3) separate along the directive slide track, which locates in the accessory substrate (2).

Figure 8:
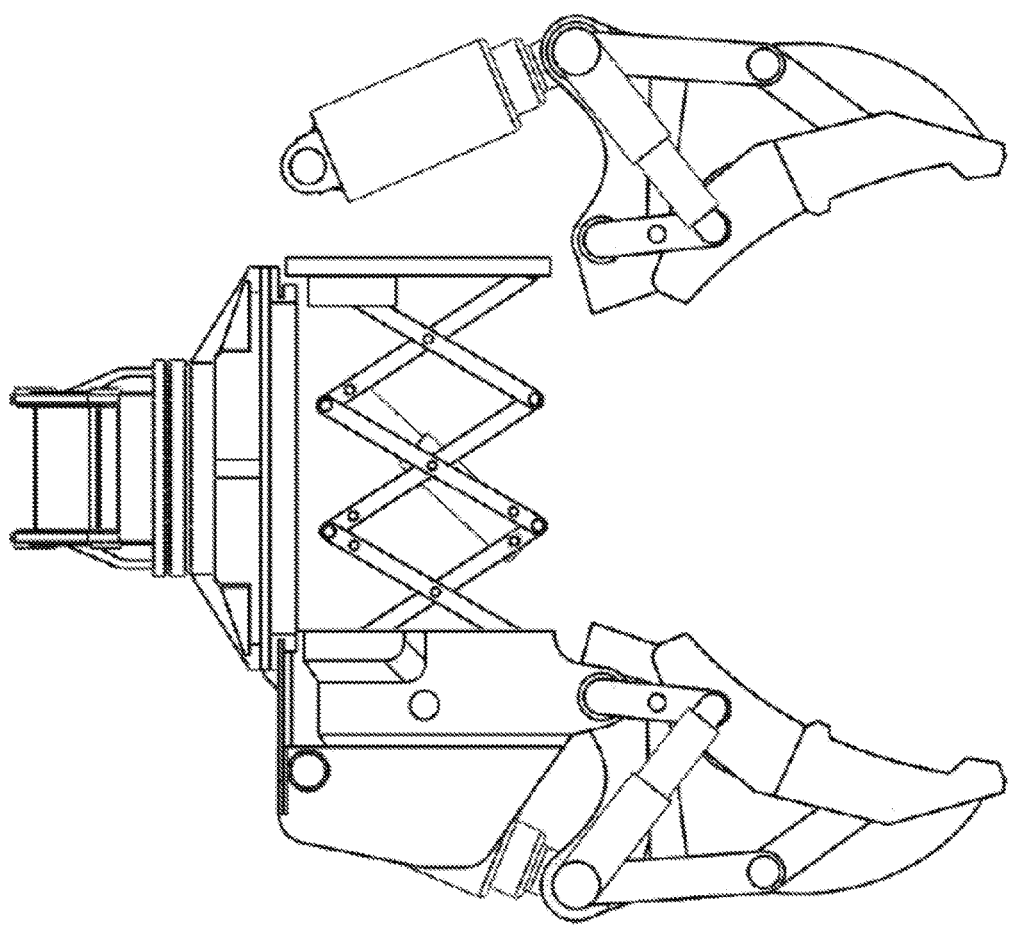
FIG. 8 illustrates a separation state of an accessory holder.
Figure 9:
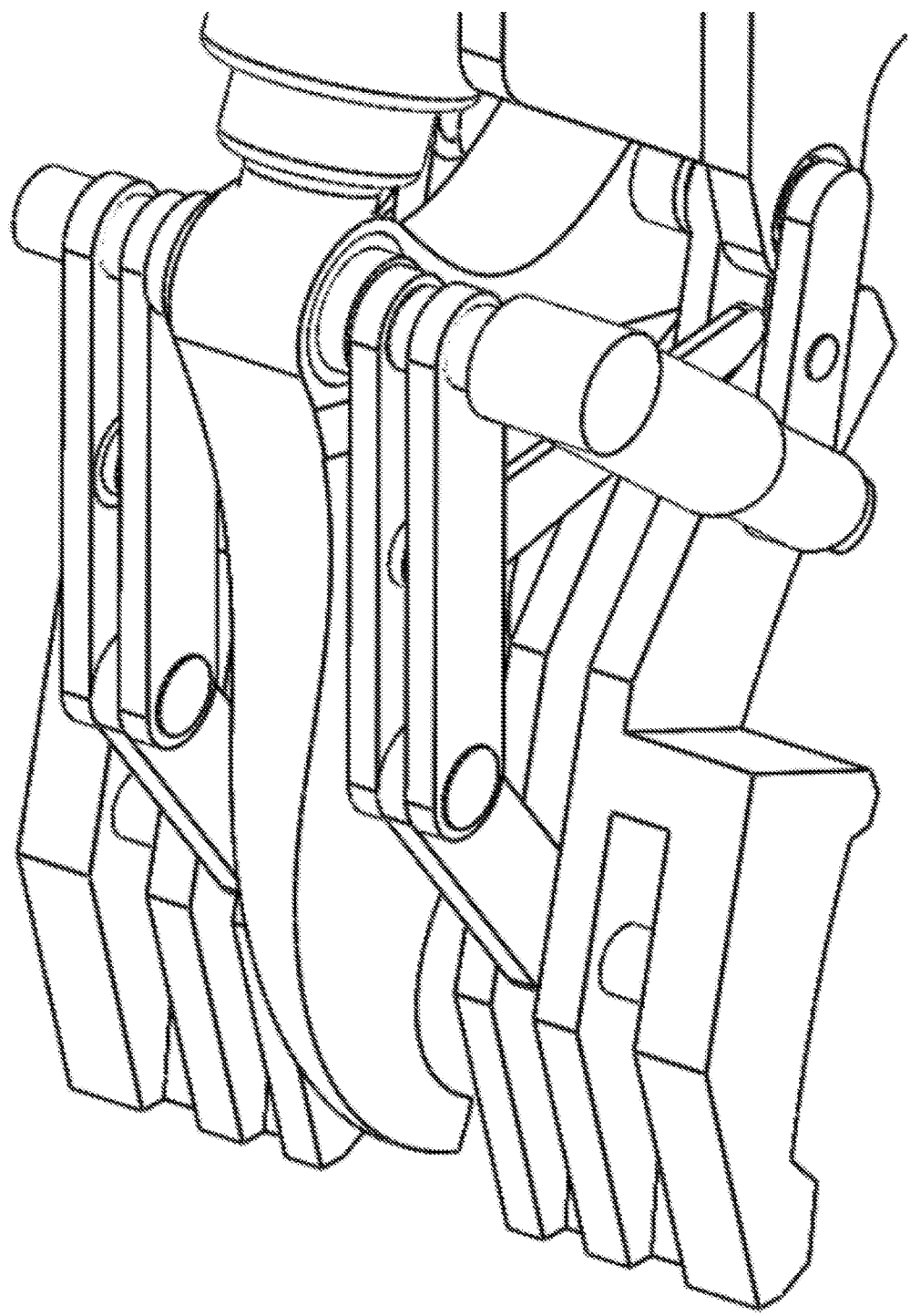
FIG. 9 illustrates an axonometric drawing of a 6-link rods mechanism.
Figure 10:
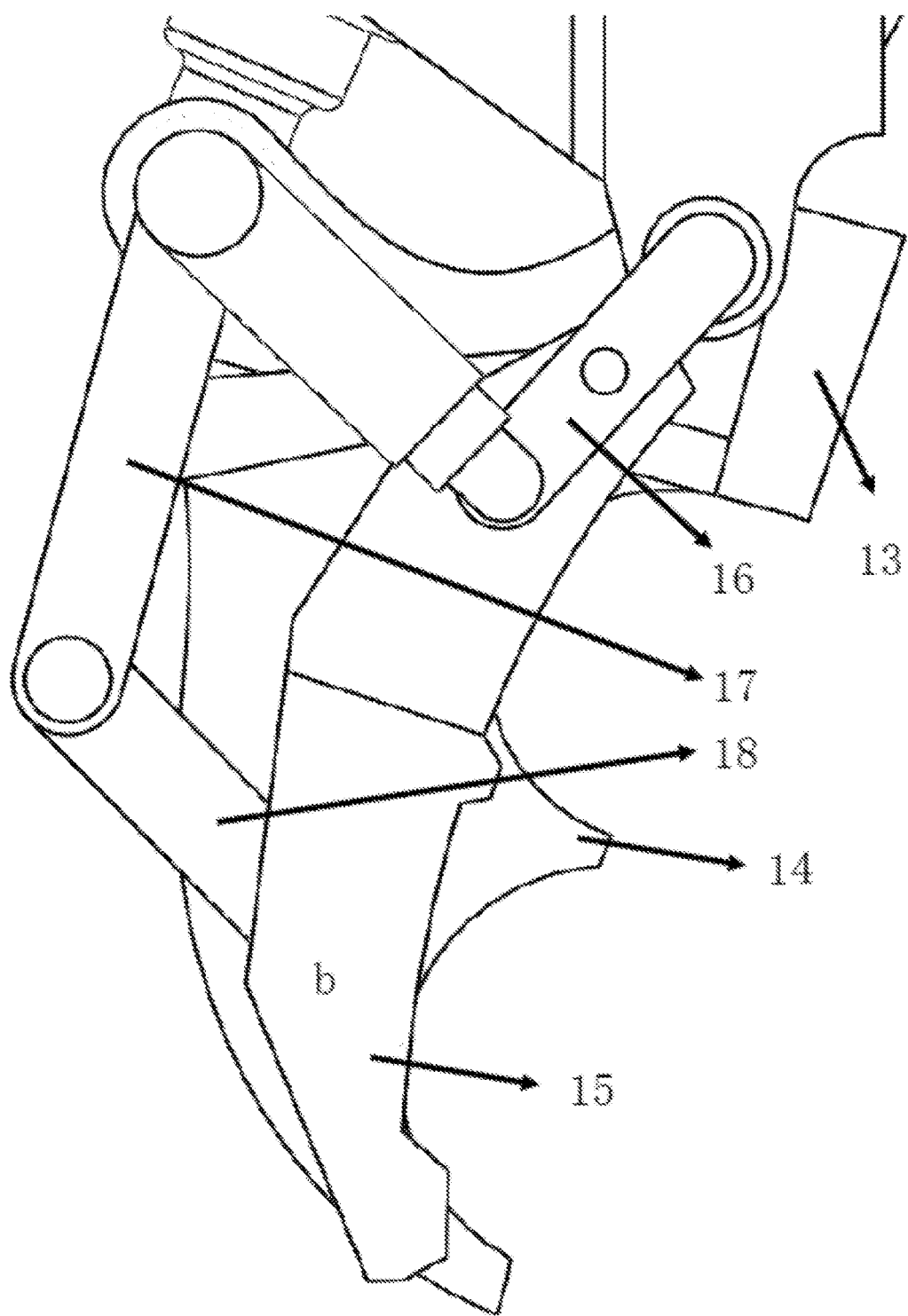
FIG. 10 illustrates a 6-link rods mechanism under a withdrawing state.

In FIG. 8, to satisfy the requirement of lateral dimension, hydraulic cylinder (10) is locked. Locked block (7) located in the accessory holder (3) is inserted into locking slot (6) distribute on both sides of the accessory substrate (2) to make the location of the accessory holder (3) is immobilized. In FIG. 10, clamping paw (15) is in a withdrawing state. Unlocking the locking state of swing hydraulic cylinder (19) is to drive bending handle (16) swing appropriate angle, and it drives the motion of 6-link rods mechanism including hydraulic cylinder (19), bending handle (16), transition rod (21), first-link rod (17), second-link rod (18) and clamping paw (15).

Figure 11:
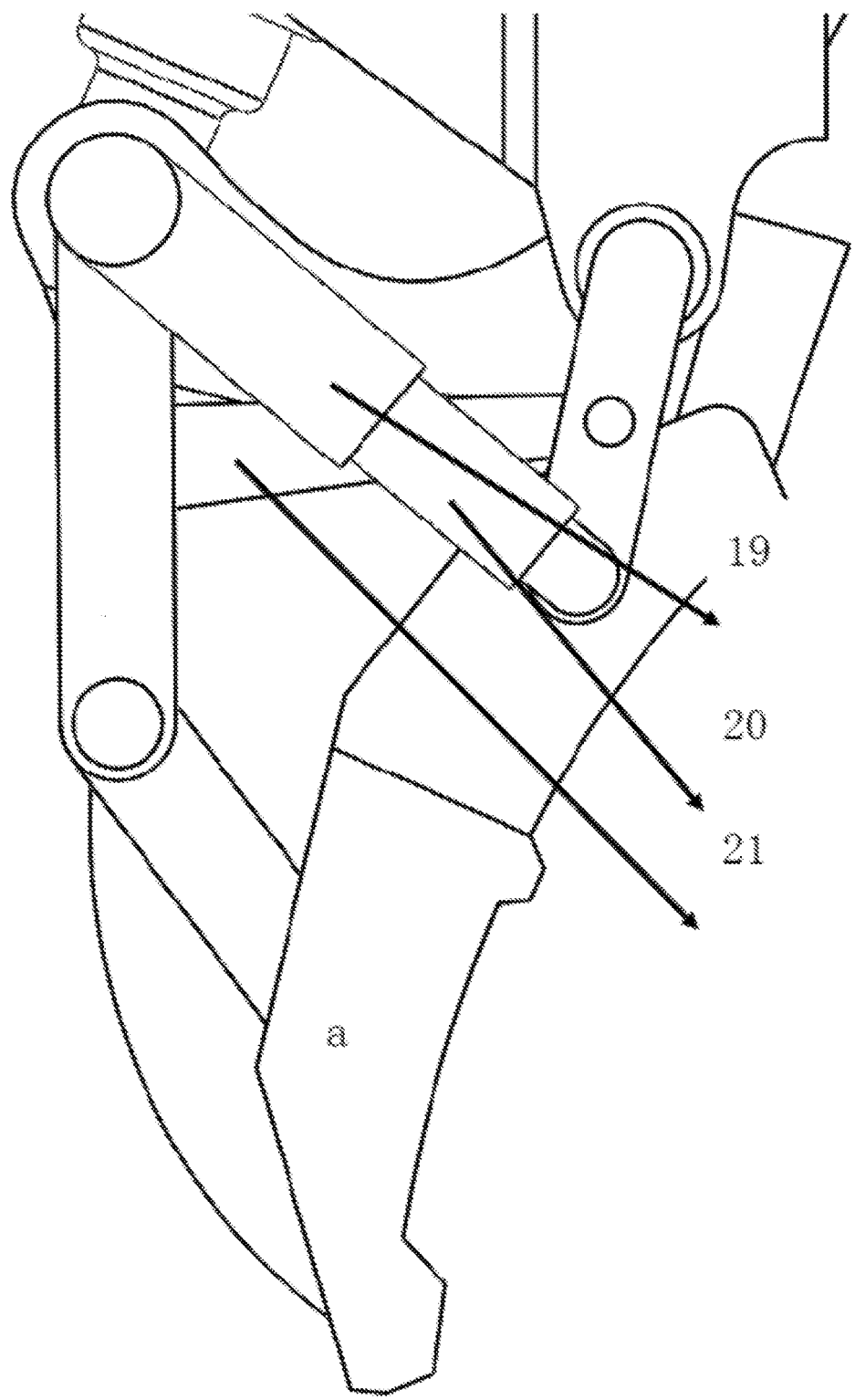
FIG. 11 illustrates a 6-link rods mechanism under an extending state.

In FIG. 11, clamping paw (15) moves to the location, and swing hydraulic cylinder (19) is locked. Head of hydraulic shearing equipment (13) and crushing the head of hydraulic shearing equipment (14) of hydraulic shearing equipment (5) are covered by the edge of a clamping paw to prevent the multifunctional accessory from interfered by hydraulic shearing equipment (5) after the working process.

Figure 13:
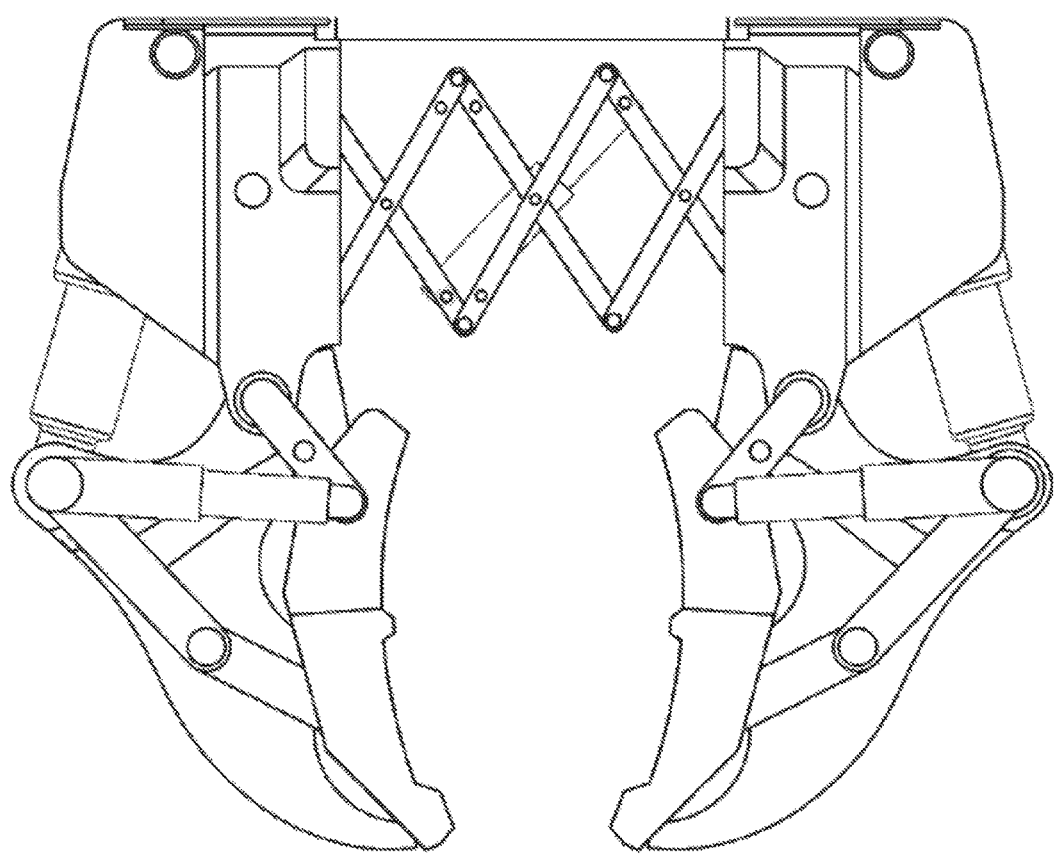
FIG. 13 illustrates an accessory under a clamping state.
Figure 14:
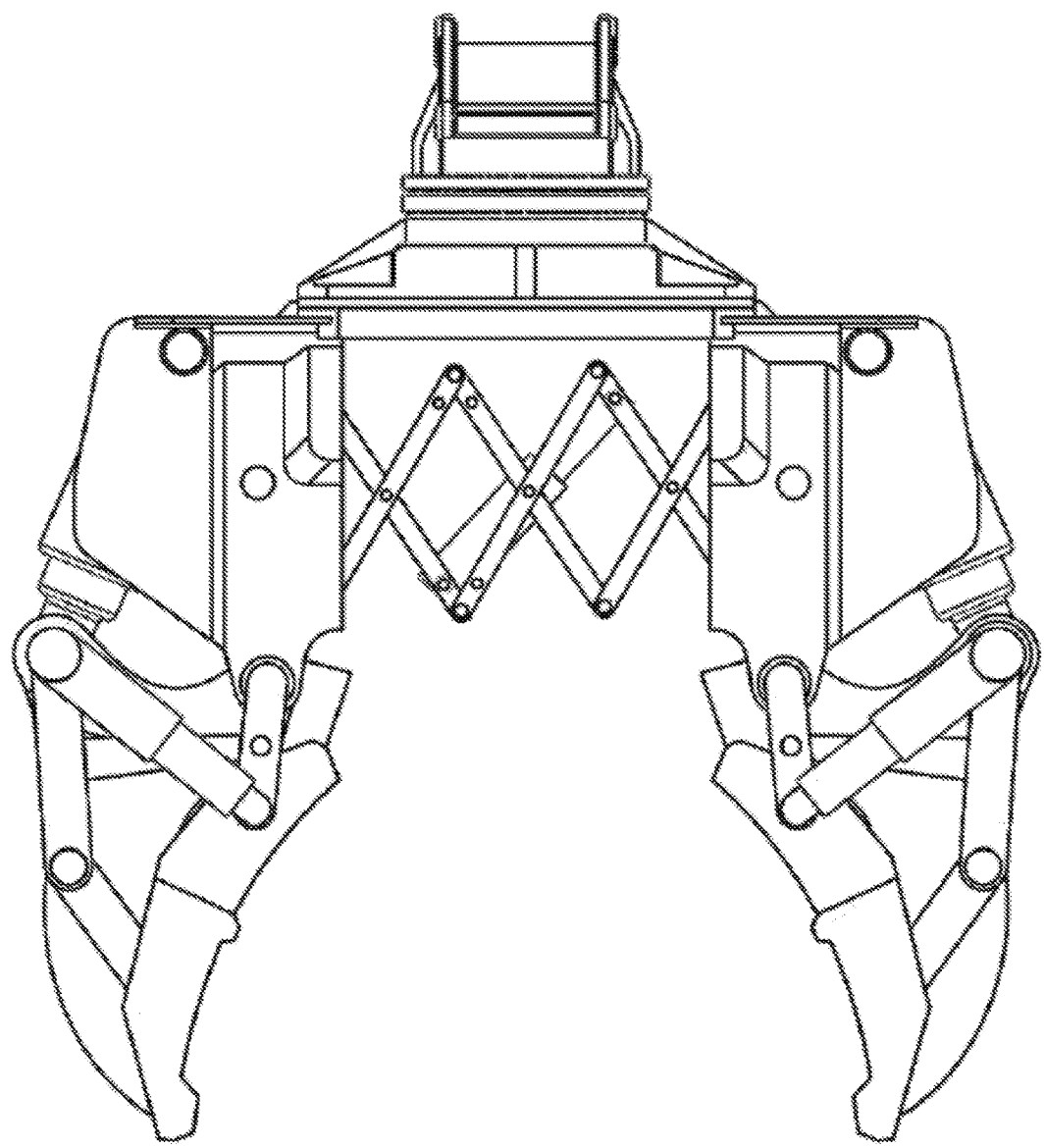
FIG. 14 illustrates an overall structure of the present disclosure.

In FIG. 13, drive hydraulic cylinder (4) drives hydraulic shearing equipment (5) such that clamping paw (15) on the top of hydraulic shearing equipment (5) implements the clamping function.

What is claimed is:

1. A multifunctional engineering accessory with a 6-bar mechanism, the accessory comprising:
   a 6-link rod clamping device,
   a shear-fork separation device,
   a shearing device, and
   a locking device; wherein
   the 6-link rod clamping device comprising:
      a swing hydraulic cylinder,
      a bending handle,
      a transition rod,
      a first-link rod,
      a second-link rod, and
      a clamping paw,
   the 6-link rod clamping device is immobilized on a hydraulic shearing equipment;
   the swing hydraulic cylinder connects with the bending handle;
   the transition rod connects with the first-link rod and the bending handle respectively;
   the first-link rod connects with the second-link rod;
   the bending handle and the second-link rod connect with the clamping paw to ensure a relative location of the clamping paw on the hydraulic shearing equipment;
   the bending handle driven by the swing hydraulic cylinder moves to a different location to implement an extending process and a withdrawing process of the clamping paw;
   the clamping paw moves to a location "a," the swing hydraulic cylinder is locked to make clamping paw immobilized on the location "a," and the extending process of clamping paw is implemented;
   the swing hydraulic cylinder opens, the clamping paw moves to a location "b" which is driven by bending handle, the swing hydraulic cylinder is locked, and the withdrawing process of clamping paw is implemented;
   the shear-fork separation device comprising:
      a hydraulic cylinder,
      a hydraulic cylinder driving rod,
      a fixing plate,
      cross rods, and
      connection rods;
   the hydraulic cylinder and hydraulic cylinder driving rod to form a hydraulic pressure driving system;
   the connection rods are cross-connected with each other to form a shear-fork structure;
   the hydraulic cylinder driving rod connects with the connection rods;
   the cross rod is set on a connection point of two connection rods to ensure the stability of the shear-fork structure;
   the connection rods connect with the fixing plate;
   the fixing plate connects with an accessory holder;
   movement of hydraulic cylinder driving rod is driven by the hydraulic cylinder to push the fixing plate connected with holders to move such as to implement separation of the accessory holder and to satisfy lateral dimension requirement of a clamping function;
   the shearing device comprising: a hydraulic shearing equipment and a hydraulic driving cylinder;
   the shearing device is installed on the accessory holder;
   the hydraulic shearing equipment connects with the accessory holder;
   the hydraulic driving cylinder connects with the hydraulic shearing equipment to provide power;
   the 6-link rod clamping device is installed on two sides of the hydraulic shearing equipment;
   the hydraulic cylinder drives the multifunctional engineering accessory to implement shearing, crushing and clamping functions;
   the locking device comprising: an accessory substrate and a located block;
   the locating slot is set on the accessory substrate, the locating slot includes 6 different locations: locations 1-6, 6 locations are symmetrically distributed along the center line of the accessory substrate;
   a slide track is set on the accessory substrate to implement rectilinear motion of separation and closing of the accessory holder;
   the initial location of located block is inserted into location 1 and location 2 of the locating slot to maintain a closure state of the accessory holder;
   the located block descends and breaks away from location 1 and location 2 of the locating slot, the accessory holder is separated;
   after the separation process of the accessory holder is finished, the located block is inserted into location 3, location 4, location 5 and location 6 of the locating slot to implement immobilization of the accessory holder.

2. The multifunctional engineering accessory of claim 1, wherein there is relative movement between the accessory substrate and the accessory holder; the slide track and the locating slot is set on the accessory substrate; the locating slot includes 6 different locations, location 1 and location 2 are used for immobilizing a location of the accessory holder under the closure state; location 3, location 4, location 5 and location 6 of the locating slot are used for a location of the accessory holder under an open state; the top of the accessory substrate connects with the angling cylinder such as to make the multifunctional engineering accessory spin on the surface.

3. The multifunctional engineering accessory of claim 1, wherein the accessory holder is a separable structure; the located block is installed on the accessory holder, which is extended and withdrawn to implement separating and immobilization connection between the accessory substrate and the accessory holder.

* * * * *